May 20, 1969 S. L. FUDALEY 3,445,835

CAPACITIVE PROXIMITY SENSOR

Filed Nov. 9, 1965 Sheet 1 of 2

United States Patent Office 3,445,835

Patented May 20, 1969

3,445,835

CAPACITIVE PROXIMITY SENSOR

Solly L. Fudaley, Palos Park, Ill., assignor to R-F Controls, Inc., Chicago, Ill., a corporation of Illinois Filed Nov. 9, 1965, Ser. No. 506,956

Int. Cl. G08b 13/26

U.S. Cl. 340—258 12 Claims

ABSTRACT OF THE DISCLOSURE

A proximity sensor comprises an antenna for establishing a low frequency electromagnetic field. A balanced oscillator changes its output frequency responsive to an object entering or leaving the field. Responsive thereto, a suitable control function is performed, as by turning off a machine tool, for example.

This invention relates to sensors and more particularly to proximity sensors for guarding against persons or object intruding into or removing themselves or things from forbidden areas.

Many examples could be cited to illustrate when and where proximity sensing may be required. A few such examples might include perimeter or boundary controls for restricted or danger areas, burgulary or security controls for houses or buildings, guide wires for directing moving objects, counters, sorters, and measuring devices, or the like, for product handling. Yet another example of when a proximity sensing means is required includes the use of automatic controls for machine tools, as when a punch press is turned off it an operator puts his hand under the ram. Still other examples will readily occur to those skilled in the art.

In the past, proximity sensors have sometimes depended upon the establishment of radio frequency fields which are disturbed by the intruding object. This has caused problems because the RF field spread out and covered an extremely large non-critical area. This makes it difficult to sense objects moving into a relatively small critically controlled area because, for present purposes, a detector which gives useless alarms for entry into an overly large non-critical field is almost as bad as one which fails to give desired alarms for entry into the relatively small critical area.

The establishment of this high, radio frequency radiation field also caused noise in radio and other communication receivers and provoked retaliation by governmental regulatory agencies.

To avoid these and other problems known, proximity sensor devices have sometimes turned to the use of frequencies which are generally somewhat lower than the RF bands. However, these previous attempts to use these lower frequencies have not been successful because the radiation of low frequencies creates a high power requirement. Also poor selectivity and sensitivity have resulted from the heretofore imprecise response to disturbances of these low frequency fields.

Accordingly, an object of the invention is to provide new and improved proximity sensors. In greater detail, an object is to provide a low frequency sensor which has high selectivity and sensitivity.

A further object of the invention is to provide proximity detectors of general utility which are, nevertheless, easily adaptable to specific uses.

Yet another object is to provide low cost sensors having greater sensitivity, selectivity, and reliability than was heretofore available. More particularly, an object is to provide sensors of a type which give immediate alarm signals if improperly adjusted, to thereby force an operator using the sensor to exercise a high degree of care while making necessary adjustments.

In keeping with one aspect of the invention, these and other objects are accomplished by means of a phase shift oscillator which uses a balanced filter device to provide a regenerative or positive feedback. The balanced filter is tuned to give the oscillator a low frequency output. This output is applied to an antenna to set up a low frequency field around the perimeter of a controlled area. If any foreign object or person intrudes into the field or removes itself or is removed from the field, the balance of the filter is upset and the oscillation changes in a significant characteristic. A detector responds thereto and gives appropriate alarm signals.

The term "low frequency" is used herein to mean a frequency, for any given proximity sensor, wherein the propagation of magnetic waves is attenuated rapidly by the natural factors of the earth, air, adjacent structures and the like. The amount or degree of attenuation required, per unit distance of wave travel, varies as a function of the proximity sensing requirements.

The term "phase shift oscillator" is used herein to describe an oscillator that has a network of reactive and resistive elements to shift the phase of an input to output signal. The shifted signal is then used to provide an oscillation causing positive feedback to the input of the oscillator. A desired characteristic of each phase shift oscillator is a sharply tuned cut-off characteristic whereby oscillations either stop or increase in intensity if the phase shift changes in any significant degree.

The term "balanced filter" as used herein means one where a signal fed into the input of the filter is shifted by a fixed amount before it leaves the output of the filter if the filter is then in balance. If, after the filter has been balanced, any reactive or resistive device is tapped into any point in the filter, the phase angle of the output signal will shift significantly. In this particular embodiment of the invention, the desired phase shift angle within the filter itself is selected to be 180°.

As this description proceeds, it will be convenient to describe specific means for accomplishing the above stated objects and overcoming the problems which have existed heretofore. However, the claims are not to be construed as limited to these specific means. Quite the contrary, the claims are to be construed broadly to cover all reasonable equivalents of the described means.

With this background in mind, the nature and principles of the invention will become more apparent from a study of the attached drawings, in which.

Figure 1:
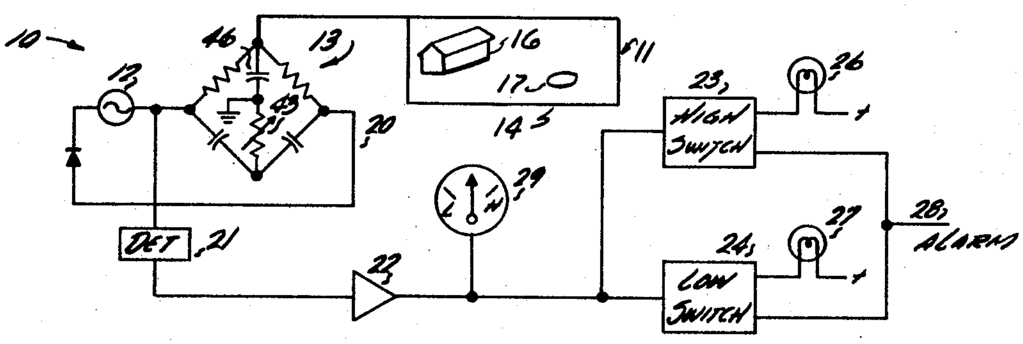
FIG. 1 is a block diagram which shows the general principles of the invention and illustrates a general usage of the sensor as an area protecting device.

In FIG. 1, the proximity sensor 10 is shown as protecting a restricted area 11. The sensor 10 includes a low frequency oscillator 12 which is set into oscillation by means of a positive feedback signal extended through a balanced filter or network 13. The filter is coupled to a sensor device or antenna 14 which runs around the perimeter of a restricted area. The device 14 is an antenna for radiating the low frequency energy produced by the oscillator 12. Since this is a low frequency field, it will not radiate or spread very far from the antenna or sensor device 14. The low frequency field is allowed to spread or radiate over a distance or area which is controlled by the amount of energy put into the antenna 14.

The bridge 13 is adjusted to be in balance when the field radiated by antenna 14 is in a null or desired quiescent condition. The nature of the restricted area is not important. For illustrative purposes, the drawing shows a house 16, and it may be assumed that the device is a burglar alarm. The area also includes an open hole 17 to illustrate a use of the invention as a safety boundary. These particular uses are exemplary and are not limiting; they could be expanded greatly.

The bridge filter 13 is balanced with respect to the field of the sensor device 14 in a quiescent condition. When so balanced, the output of oscillator 12 is fed through filter 13 and then over conductor 20 to the input of the oscillator 12. The phase shift is such that this feedback signal is in phase with the input to the oscillator 12 to drive it into oscillation. If a foreign object or person thereafter intrudes into or is removed from the field set up by the oscillator driving into antenna device 14, the balance of the bridge filter 13 is changed. For example, if something intrudes into the field the feedback signal is made to be more nearly into phase with the oscillations from circuit 12. This increase in phase synchronism increases the oscillation of circuit 12.

A detector 21 detects the increase of oscillation and gives a corresponding signal through an amplifier 22 for operating one of two switching circuits 23 or 24 to give output signals of either of two characteristics. The determination of whether the high or low signal switch operates depends on whether the bridge is unbalanced in a direction which leaves an electronic device in the oscillator in an "off" or "on" condition. This, in turn, depends on whether an object moves into or out of the antenna field. Either of the switches 23, 24 operates and gives a suitable alarm as by lighting a lamp 26 or 27 or energizing a wire 28, for example. The system may be adjusted, for example, so that a high signal indicates that an object or person has intruded into the low frequency field and is too close to the antenna. A low signal indicates that the object or person has been removed from the field and is now too far from the antenna.

A meter 29 is provided to give a center scale reading when the filter is properly balanced with respect to a null, low frequency field in the antenna. The high scale, low scale adjustments required to get the center scale reading tend to force persons using the sensor to make accurate balance settings when adjusting the bridge 15. Thus, if the operator setting the balance of bridge 13 fails to set to the center scale, the bridge circuit will very likely go off balance in either the high or the low direction. This will cause an immediate alarm and force the operator to reset the balance. Thus, the system has a built-in human failure alarm.

The foregoing description has illustrated the general utility of the invention to protect the perimeter or a boundary of any restricted area. There are also many other specific purposes and uses to which the invention may be put. These purposes and uses may be as many and varied as may occur to those skilled in the art. However, to illustrate a few such purposes and uses reference may be made to the disclosures of FIGS. 2–4.

Figure 2:
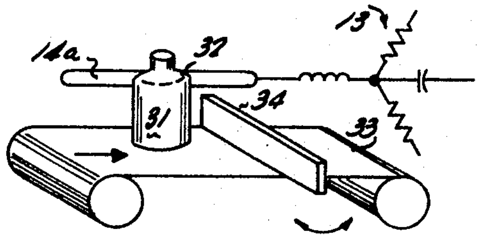
FIG. 2 shows an exemplary fragement of the FIG. 1 system adapted to the specific use of product handling as by counting, sorting or measuring.

In FIG. 2, the low frequency radiator or antenna **14*a* is placed in a product handling area. More specifically, it is drawn adjacent a bottle 31 which may represent a product that is to be counted, sorted, or measured. This is one of many bottles passing down a production line conveyor 33. For example, the sensor or antenna 14*a* may be adjusted to give a high or low signal depending upon whether a fill line 32 in the bottle is too high or too low. Depending thereon, a door 34**, or other product handling device, may be operated to pass or divert the bottle.

Figure 3:
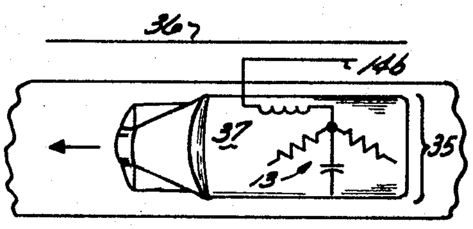
FIG. 3 shows another exemplary fragment of the FIG. 1 system adapted to the specific use of directing a vehicle or other object along a guide wire.

In FIG. 3, the sensor device or antenna **14*b* is carried by a moving vehicle and is held adjacent a guide wire 36 or rod extending along a road way 35. The guide wire 36 is at ground potential; it could even be the guard rail at the side of the road. The oscillator 12 energizes the antenna 14*b* to set up a low frequency field which is balanced with respect to a given position relative to the guide wire. If a vehicle or other object 37 is placed on the road way near the guide wire 36** a high or a low signal will be given depending upon whether the vehicle veers toward or away from the guide wire. This way, a servo device may be made to respond and steer the vehicle as it moves over the highway.

Figure 4:
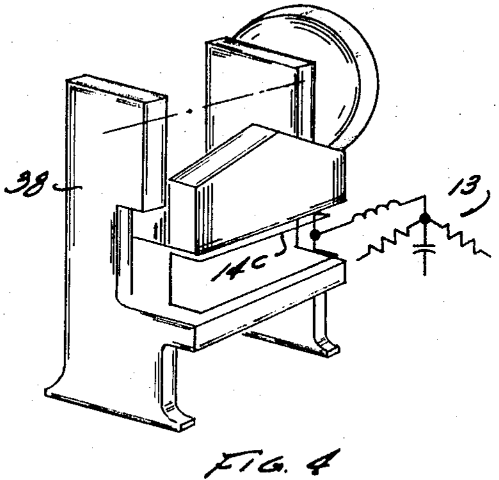
FIG. 4 shows still another fragment of the FIG. 1 system adapted to the specific use as a safety control for an automatic machine tool.

In FIG. 4 the sensor device or antenna **14*c* is placed around the perimeter of the dangerous work area of an automatic machine tool 38. If a person places his hand in the danger area, the low frequency field changes, the bridge 13** is unbalanced and the machine comes to a "red button" stop.

Figure 5:
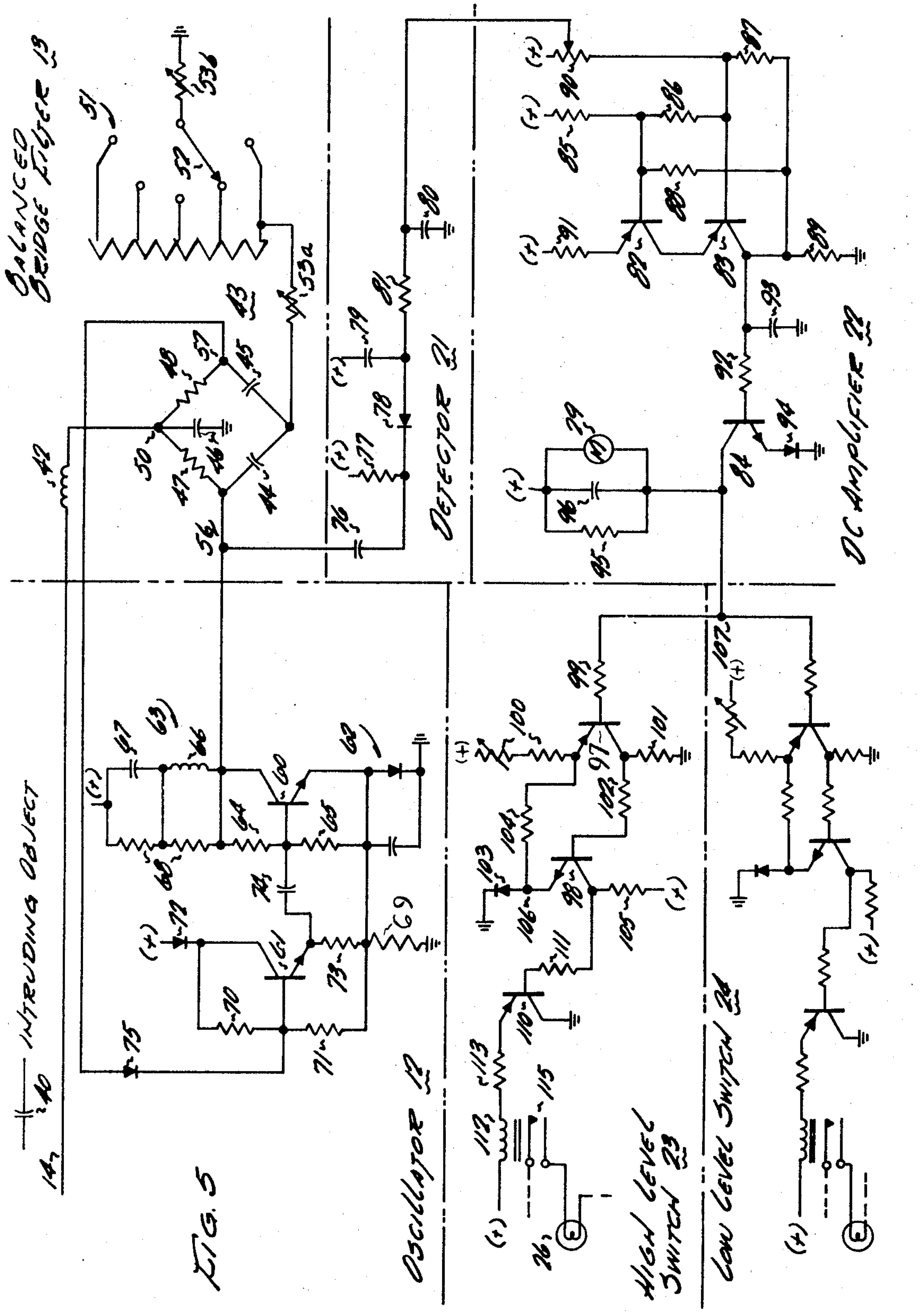
FIG. 5 is a schematic diagram showing an exemplary circuit incorporating the principles of the invention and adapted to the specific uses shown in FIGS. 1–4 and other uses which will become apparent to those skilled in the art.

The nature of the circuit details of an exemplary proximity sensor, built according to the teachings of the invention, may become more apparent from a study of FIG. 5. In this figure, the components corresponding to the blocks in the block diagram of FIG. 1 are set apart by dot-dashed lines and identified by the same reference numerals as those used in FIG. 1 to identify similar parts.

The sensor device or antenna 14 is placed at the boundary or perimeter of a protected area and in a position such that an intruding object or person 40 causes a capacitive coupling effect which changes the tuning of the antenna.

The antenna 14 is coupled to the associated balanced bridge circuitry via a choke coil 42 which prevents any high frequency noise appearing on the antenna 14 from feeding into the bridge circuit 13 and yet allows low frequency effects to be felt in the bridge 13. The noise could result from RF signals, power supplies, commercial transmitters, sign flashes, diathermy equipment and the like.

The bridge filter circuit may take many different forms. It is here drawn as a pair of balanced T filters, sometimes called a twin T filter. One of the T filters includes a resistance 43 in the stem of the T and a pair of capacitors 44, 45, one being in each arm of the T. The other T filter includes a capacitor 46 in the stem of the T and a pair of resistors 47, 48, one being in each arm of the T. These two T circuits are here shown in the geometry of a well known bridge configuration so that the balance may be easier to see. A filter characteristic which is here sought by this use of a twin T filter is a sharp cut-off, narrow band response. The antenna 14 is preferably coupled into the capacitive side of the bridge since the effect being felt is capacitive in nature. The circuit is more noise free and sensitive when the connection is as here shown than it would be if the connection of 42, 43 were reversed.

For convenience of expression, the bridge filter described in the preceding paragraph and in the appended claims is called a "parallel twin T bridge."

The resistors 43, shown separately in FIG. 5, are a part of the bridge as in FIG. 1. The election to use the FIG. 1 drawing is so that the balancing feature may be more apparent. The election to use the separate showing of FIG. 5 is so that the relationship of the balance between the sensor device or antenna 14 and the resistors 43 will be more apparent. That is, by means of adjustments at 43, the bridge elements 44–48 are balanced against the potential appearing at point 50. This potential is, in turn, set by the voltage division between the particular antenna and the resistor tap or terminal 51 engaged by a switch wiper arm 52. A pair of potentiometers **53*a*** and 53b are provided to make fine adjustments in the potential at the point 50.

The oscillator input to the bridge 13 is applied at the point 56, and the positive feedback output from the bridge is taken from the point 57. The capacitors 44, 45 cause a 90° phase shift and the capacitor 46 causes another 90° phase shift, thus making a total of 180° phase shift between the signals appearing at the points 56 and 57.

The phase shift oscillator 12 includes a pair of NPN transistors 60, 61. The transistor 60 is coupled in a common emitter configuration to cause a 180° phase shift between the signals applied to its base and taken from its collector. The remainder of this transistor circuit includes a degenerative feedback and emitter bias network 62. A collector load 63 and a voltage divider 64, 65 for establishing a base bias potential. The collector load 63 includes an RF frequency choke coil and a capacitor bypass 67 for reducing any noise in the network which may have passed through the choke coil.

As will become more apparent, the transistor 60 circuit goes into oscillation because the signal applied to its base goes through a 180° phase shift by the time that it reaches the voltage point 56. In the balanced bridge filter 13, it experiences another approximately 180° phase shift. Hence, the signal which is fed back from point 57 to the base of transistor 60 has undergone about a 360° phase shift to reinforce the voltage swing at the collector of the transistor 60. This causes the circuit to go into oscillation.

The remainder of the oscillator circuit 12 includes an NPN transistor 61 in an emitter follower configuration. This configuration is selected because it does not shift the phase of the feedback signal and because it provides a good input isolation. The resistor 69 provides emitter stabilization. The resistors 70, 71 form a voltage divider for establishing a base bias for the transistor 61. The diode 72 clamps the collector voltage. The resistors 73 and 71 provide a base to emitter coupling so that these two electrodes experience the same changes caused by temperature variations, these changes being fed back to compensate for the variations. The capacitor 74 provides an interstage coupling.

The diode 75 is part of the positive feedback circuit which is used for isolating the base of transistor 61 from the collector of the transistor 60 and yet allow the positive feedback current to flow. The diode 75 also stabilizes the emitter follower circuit of the transistor 61.

The operation of oscillator 12 and bridge filter 13 should now be apparent. The bridge 13 is balanced by adjustment of the switch arm 52 and the potentiometer 53 to provide a balance when in the null or quiescent sensor device or antenna 14 loading. A positive feedback signal feeds from the collector of the transistor 60 through the balanced bridge 13, diode 75, the emitter follower 61, and capacitor 74 to the base of the transistor 60. When the bridge is in balance, the positive feedback signal traversing this closed loop experiences about a 360° phase shift. Thus, reinforced the circuit 12 breaks into oscillation.

If the loading effects of the antenna change by the intrusion or removal of object 40, the phase shift changes in bridge 13 because the voltage changes at point 50. Current no longer divides in the same ratio between the bridge arms 44, 45, and 47, 48. Depending upon whether there is intrusion or removal, the positive feedback phase shift changes toward or away from 360°. Then, there is or is not reinforcement of signals at the base of the transistor 60, and oscillations increase or stop. Because of the sharp tuning of the filter 13, the effects of unbalance are felt quickly and positively.

The state of oscillations or lack of oscillations is detected by the detector circuit 21. The components of this circuit are a coupling capacitor 76, a load resistor 77, a rectifier 78, and two smoothing capacitors 79, 80, and a resistor 81 which reduces ripple. If the circuit 12 is in a state of oscillation, a voltage is capacitively applied through the rectifying diode 78 and smoothed by the filtering action of the capacitors 79, 80.

The output of the detector 21 is coupled to the input of the D.C. amplifier 22 which amplifies any D.C. changes occurring in the output of the detector 21. The D.C. amplifier includes a pair of PNP transistors 82, 83 and an NPN transistor 84, all of which are arranged in common emitter configuration.

The base biases for the transistors 82, 83 are established by a voltage divider 85–89. Connected as one arm of the voltage divider is a potentiometer 90 which provides a sensitivity adjustment device. The emitter of the transistors 82, 83 is biased via a resistor 91, and the collector is loaded by the resistors 89, 92.

Figure 6:
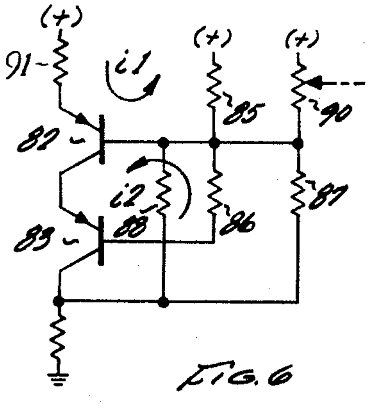
FIG. 6 is a fragment of the circuit of FIG. 5 showing how the circuit is stabilized against temperature changes.

The circuit stabilizes the transistors 82, 83 against variations caused by ambient temperature changes. More particularly, as shown in FIG. 6, the base current *i*1 for the transistor 82 flows around a loop from (+) battery through the resistor 91, emitter-base of the transistor 82, and resistor 85 to (+) battery. The base current *i*2 for the transistor 83 flows around a loop including the resistor 86, the base-emitter of transistor 83, the collector-base of transistor 82, and back to the resistor 86. The path between the base of the transistor 82 and the junction of resistors 85, 86 is common to both currents *i*1 and *i*2. Since the currents *i*1, *i*2 oppose each other in this common path, and further, since the ambient temperature changes produce the same effects in the base currents for both transistors 82, 83, the changes effectively buck and cancel each other. Thus, ambient temperature changes are cancelled.

A capacitor 93 is also connected to the collector of the transistor 83 to bypass noise to ground.

The collector of the D.C. amplifier, PNP transistor 83, is connected to the base of the NPN transistor 84 via a coupling resistor 92. The emitter of transistor 84 is clamped to ground via a diode 94. The collector of the transistor 84 is coupled to a three element circuit comprising a load resistor 95, a noise bypass capacitor 96, and the meter 29.

The balanced bridge adjustments are made so that this meter 29 normally reads a center scale deflection during quiescent conditions. If the amplified D.C. output voltage level falls, the meter 29 gives a low scale reading. If it rises, the meter gives a high scale reading.

Two switching circuits 23, 24 are provided to respond to these high and low voltage levels, respectively. Since two switching circuits are the same except for the biasing required for the high and low scale responses, only one of these switching circuits will be described in detail.

Two common emitter transistors (a PNP and an NPN) are shown at 97, 98, respectively. The base of the PNP transistor 97 is coupled to the collector of the transistor 84 via an input isolation resistor 99. The emitter of the transistor 97 is biased by an adjustable series of resistors 100 which set the high voltage threshold response level of switch 23.

The collector load for the transistor 97 is shown at 101. A resistor 102 couples the collector of the transistor 97 to the base of the transistor 98. The diode 103 clamps the emitter of the transistor 98 to ground, and the resistor 104 cooperates with the resistors 100 to divide a voltage and provide a bias for the emitter of the transistor 97. The collector load for the transistor 98 is drawn at 105.

The circuit values and configurations are such that the transistor 97 provides a high gain and the transistor 98 provides a fast switching response. The principle is that the transistors 97, 98 snap "on" and the transistor 98 drives into saturation whenever the voltage at the point 106 is less than the voltage at 107.

The high level switching circuit 23 operates this way. When the transistor 97 is off, current flows from positive battery through the resistors 100, 104 and diode 103 to ground. The voltage on the emitter of the transistor 98 tends to go positive, and it turns off. When the amplified detector voltage at point 107 goes negative relative to the voltage at the point 106, the transistor 97 turns on and goes into saturation. Current then reduces sharply in the resistor 104.

The emitter of the transistor 98 goes negative, and it turns on. When the transistor 98 turns on, the base of an emitter follower 110 goes negative responsive to a voltage applied from the collector of the transistor 98 through resistor 111 to the base of the transistor 110. The emitter follower configuration is used at 110 to provide a good isolation between the switching transistor 98 and an output relay 112. Interposed between the relay 112 and the transistor 110 is a load limiting resistor 113.

When the transistor 110 turns on, current flows through the winding of the relay 112. This relay operates and closes its contacts 115 to operate an alarm device 26. The alarm is here shown as an examplary lamp. However, an audio sounder device, or a "red-button" machine tool stop signal could also be shown.

The entire proximity sensor circuit of FIG. 5 operates this way. The antenna or sensor device 14 is placed at the boundary or perimeter of the controlled area. Then, while the antenna radiates a low frequency in a null condition with no intruding object or person, the switch arm 52, and potentiometer 53 are adjusted so that the meter 29 gives a center scale reading.

The bridge filter circuit 13 is balanced to give a positive feedback through the diode 75 to set the circuit 12 into oscillation. As the circuit oscillates, the transistor 60 turns off and on.

Each time that it turns on, a ground voltage appears at point 56. Thus, pulses of ground voltage are passed through the diode 78 to make the base of the transistors 82, 83 negative relative to their emitters. The transistors 82, 83 conduct and apply a positive voltage to the base of the transistor 84. The transistor 84 controls the level of the current flowing into the meter 29, and it gives a center scale reading. Neither of the switches 23, 24 has operated at this time.

Suppose that an intruding object enters the low frequency antenna field and capacitively couples it loosely to ground. The bridge filter 13 becomes unbalanced and the positive feedback changes in a direction which increases oscillation with the transistor 60 either turned on or conducting at a relatively high level. The ground voltage connected at 62 makes the voltage at point 56 move in a ground direction. The current through diode 78 increases, and the base of the transistors 82, 83 become more negative. The transistors 82, 83 conduct more current, and the base potential of the transistor 84 moves toward the positive battery applied through the resistor 91. The current through transistor 84 increases. The meter 29 gives a high scale reading and the switching circuit 23 operates to give a high voltage signal.

Next, assume that an object or person is removed from the low frequency field of the antenna or sensor device 14. The capacity 40 coupling to ground is reduced to change the potential at point 50. The bridge 13 becomes unbalanced in a direction which tends to hold the transistor 60 off or to make it conduct less heavily. The ground voltage applied through the transistor 60 falls, and a reduced current through resistors 68 makes the point 56 move to a more positive voltage. Current decreases through the diode 78. The base of transistors 82, 83 becomes more positive. They draw less current through the resistor 89. The base of the transistor 84 goes more negative toward ground. Less current flows into the meter 29, and it gives a low scale reading. The low level switch 24 operates to give an output signal.

Those skilled in the art will readily percieve how modifications may be made in the circuit to adapt it to any particular circuit needs. However, to provide a convenient starting point for making such modifications, it may be well to give specific circuit values for one examplary circuit which was actually built and tested with excellent results.

Transistor types:

| | |
|---|---|
| NPN | 2N2905A |
| PNP | 2N2218A |

Diode types:

| | |
|---|---|
| **62** | IN290 |
| **72** | IN290 |
| **75** | IN290 |
| **78** | IN34 |
| **94** | IN290 |
| **103** | IN34 |

Resistor values:

| | |
|---|---|
| **47** | 56K |
| **48** | 56K |
| **51** (each) | 2.2K |
| **53*a*** | 30K |
| **53*b*** | 5K |
| **64** | 100K |
| **65** | 10K |
| **68** | 2.7K, 10K |
| **69** | 2K |
| **70** | 100K |
| **71** | 10K |
| **73** | 2K |
| **77** | 470K |
| **81** | 270K |
| **85** | 6.8K |
| **86** | 10K |
| **87** meg | 1.2 |
| **88** meg | 1 |
| **89** | 1.5K |
| **90** | 25K |
| **91** | 100Ω |
| **92** | 1K |
| **95** | 10K |
| **99** | 27K |
| **100** | 2K, 5K |
| **101** | 6.8K |
| **102** | 1K |
| **104** | 68K |
| **105** | 6.8K |
| **111** | 1K |
| **113** | 100Ω |

Capacitor values:

| | |
|---|---|
| **44** μμfd | 150 |
| **45** μμfd | 150 |
| **46** μμfd | 150 |
| **62** μfd | 20 |
| **67** μμfd | 220 |
| **74** μfd | .15 |
| **76** μfd | .15 |
| **79** μfd | .005 |
| **80** μfd | .005 |
| **93** μf | 5 |
| **96** μf | 5 |

Inductive values:

| | |
|---|---|
| **42** μh | 10 |
| **66** μh | 100 |

I claim:

1. A proximity sensor comprising a continuously running phase shift oscillator means, means comprising a non-inductive balanced parallel twin T filter for providing a positive feedback signal to set said oscillator circuit into low frequency oscillation, means responsive to the output of the oscillatr means for establishing a low frequency field at the boundary of a controlled area, said filter being balanced against the impedance of said last named means when said field is in a quiescent condition, means responsive to a disturbance in said low frequency field to imbalance said filter for changing the amplitude of the output of said scillator, and means responsive to said change in output amplitude for giving an output signal.

2. The proximity sensor of claim 1 wherein said output signal many have either a two amplitude characteristics, means responsive to an intrusion into said field for giving an amplitude output of one of said characteristics, and means responsive to a removal from said field for giving an amplitude output of another of said characteristics.

3. The proximity sensor of claim 1 wherein said boundary comprises at least a portion of the perimeter of the dangerous area of an automatic machine tool.

4. The proximity sensor of claim 1 wherein said boundary comprises at least a part of a housing area, and said output means comprises a burglar alarm.

5. The proximity sensor of claim 1 wherein said output means comprises means for giving a first alarm signal responsive to a disturbance in said low frequency field caused by an intrusion into said field, and means for giving a second alarm signal responsive to a disturbance in said low frequency field caused by a removal from said field.

6. The proximity sensor of claim 5 and means for adjusting the balance of said filter so that said output signal falls between said first and second alarm signals whereby a faulty adjustment of said filter causes said sensor to give an immediate alarm.

7. The proximity sensor of claim 1 wherein the boundary comprises a product handling device, said low frequency output means comprises means for establishing a field for balancing said filters when a product is properly coupled into said low frequency field and unbalanced when a product is not to coupled.

8. The proximity sensor of claim 1 wherein said boundary control comprises a guide wire extending along a road way and a vehicle, said low frequency output means comprises means on said vehicle for energizing a sensor device positioned adjacent said guide wire to establish a low frequency field balancing said filter when said vehicle is on said road and said low frequency field is properly coupled to said guide wire.

9. A proximity sensor comprising an antenna, continuously running means for establishing a predetermined normal state electromagnetic field around said antenna during selected normal state conditions, detector means for giving an output responsive to changes occurring in said normal state field when an object moves into or out of said field, and non-inductive bridge means comprising a parallel twin T bridge circuit for coupling said antenna to said detector for giving a relatively great output signal in response to a relatively small change in said field.

10. The sensor of claim 9 and means for adjusting said bridge to a predetermined state of balance during said normal field condition, said bridge losing said state of balance responsive to said changes in said normal state of said field.

11. The sensor of claim 9 and sharply tuned means for narrowly defining said normal state conditions and thereby eliminating extraneous sources of electromagnetic fields which might otherwise result from randomly appearing noise generators.

12. A proximity sensor comprising a source of an electrical signal having a predetermined fixed frequency, antenna means energized from said source via a parallel twin T bridge circuit for establishing an electromagnetic field having said pre-determined frequency, means responsive to a change in the location of an object in said field for causing a phase change in the electrical signal in said antenna as compared with the original phase of said signal, the amplitude of said signal varying as a function of the phase of the antenna signal, and detection means for causing a control function to occur responsive to said phase change in said antenna.

References Cited

UNITED STATES PATENTS

| | | |
|---|---|---|
| 2,041,114 | 5/1936 | Carini. |
| 2,319,965 | 5/1943 | Wise. |
| 3,032,722 | 5/1962 | Banasiewicz. |
| 3,067,364 | 12/1962 | Rosso. |
| 3,184,689 | 5/1965 | Wylde. |

JOHN CALDWELL, *Primary Examiner.*

D. L. TRAFTON, *Assistant Examiner.*

U.S. Cl. X.R.

331—65, 110, 135, 142; 340—38